United States Patent
Gupta et al.

(10) Patent No.: US 8,898,209 B2
(45) Date of Patent: Nov. 25, 2014

(54) COMPRESSION OF NON-DYADIC SENSOR DATA ORGANIZED WITHIN A NON-DYADIC HIERARCHY

(75) Inventors: Chetan Kumar Gupta, Austin, TX (US); Choudur Lakshminarayan, Austin, TX (US); Song Wang, Austin, TX (US); Abhay Mehta, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1159 days.

(21) Appl. No.: 12/501,446

(22) Filed: Jul. 12, 2009

(65) Prior Publication Data
US 2011/0010405 A1 Jan. 13, 2011

(51) Int. Cl.
| | | |
|---|---|---|
| *G06F 7/00* | (2006.01) | |
| *G06F 17/14* | (2006.01) | |
| *H01H 67/00* | (2006.01) | |
| *G08B 1/08* | (2006.01) | |
| *H04N 7/12* | (2006.01) | |
| *G06K 9/36* | (2006.01) | |
| *G06K 9/46* | (2006.01) | |

(52) U.S. Cl.
CPC .................. *G06F 17/148* (2013.01)
USPC ........... 708/203; 708/200; 708/201; 708/400; 340/281; 340/539.22; 375/240.19; 382/232; 382/240; 382/276

(58) Field of Classification Search
USPC ............ 708/200–201, 203, 400; 340/539.22, 340/2.81; 382/240, 251, 276; 707/3, 100; 375/240.19
See application file for complete search history.

(56) References Cited

U.S. PATENT DOCUMENTS

| | | | | |
|---|---|---|---|---|
| 5,619,621 | A * | 4/1997 | Puckett | 706/47 |
| 6,128,413 | A * | 10/2000 | Benamara | 382/251 |
| 7,624,085 | B2 * | 11/2009 | Hawkins et al. | 706/52 |
| 7,676,458 | B2 * | 3/2010 | Aggarwal et al. | 707/778 |
| 8,136,159 | B2 * | 3/2012 | Koo et al. | 726/23 |
| 8,285,838 | B2 * | 10/2012 | Rehman et al. | 709/224 |
| 8,630,965 | B2 * | 1/2014 | Savvides et al. | 706/13 |
| 2003/0235338 | A1 * | 12/2003 | Dye | 382/232 |
| 2004/0136602 | A1 * | 7/2004 | Nagaraj et al. | 382/240 |
| 2005/0200480 | A1 * | 9/2005 | Caras et al. | 340/539.22 |
| 2006/0280378 | A1 * | 12/2006 | Garofalakis et al. | 382/276 |
| 2007/0156801 | A1 * | 7/2007 | Guevorkian | 708/400 |
| 2008/0123983 | A1 * | 5/2008 | Xiong et al. | 382/249 |
| 2008/0195584 | A1 * | 8/2008 | Nath et al. | 707/3 |
| 2009/0063432 | A1 * | 3/2009 | Aggarwal et al. | 707/4 |
| 2009/0201840 | A1 * | 8/2009 | Pfeiffer et al. | 370/310 |
| 2009/0248712 | A1 * | 10/2009 | Yuan | 707/100 |

OTHER PUBLICATIONS

R. Xiong et al., "A lifting-based wavelet transform supporting non-dyadic spatial scalability," Proceedings of ICIP, 2006.
K. Chakrabarti et al., "Approximate query processing using wavelets," Proceedings of 26th VLDB Conf., 2000.

(Continued)

*Primary Examiner* — Farley Abad
*Assistant Examiner* — Henry Yu

(57) ABSTRACT

Sensor data is received from one or more sensors. The sensor data is organized within a hierarchy. The sensor data is organized within a hierarchy that is non-dyadic. A processor of a computing device generates a discrete wavelet transform, based on the sensor data and based on the hierarchy of the sensor data, to compress the sensor data. The sensor data, as has been compressed via generation of the discrete wavelet transform, is processed.

15 Claims, 6 Drawing Sheets

(56) References Cited

OTHER PUBLICATIONS

T. Li et al., "A survey on wavelet applications in data mining," SIGKDD Explorations, vol. 4, iss. 2, 2002.
S.G. Mallat, "A theory for multiresolution signal decomposition: The wavelet representation," IEEE Trans. on Pattern Analysis & Machine Intelligence, Jul. 1989.
E.J. Stollnitz et al., "Wavelets for computer graphics: A primer, part 1," IEEE Computer Graphics & Appl'ns, May 1995.
A.C. Gilbert et al., "Surving wavelets on streams: One-pass summaries for approximate aggregate queries," Proceedings of 27th VLDB Conf., 2001.
S. Guha et al., "Wavelet synopsis for hierarchical range queries with workloads," VLDB Journal, 2008.
C.A. Cabrelli et al., "Self-similarity and multiwavelets in higher dimensions," Memoirs of the AMS, 2004.
V. Chandola et al., "Outlier detection: A survey," University of Minnesota Technical Report 07-017, Aug. 2007.
D.L. Donoho et al., "De-noising by soft-thresholding," Stanford University Technical Report, 1992.
C. Gupta et al., "Outlier detection with streaming dyadic decomposition," Industrial Conf. on Data Mining, 2007.
G. Kutyniok, "The local integrability condition for wavelet frames," Journal of Geometric Analysis, 2006.
S. Mallat et al., "Singularity detection and processing with wavelets," IEEE Trans. on Information Thoery, Mar. 1992.
G. Sheikholeslami et al., "WaveCluster: A multi-resolution clustering approach for very large spatial databases," Proceedings of 24th VLDB Conf., 1998.
Y. Wang, "Jump and sharp cusp detection by wavelets," Biometrika, 1995.
D. Yu et al., "FindOut: Finding outliers in very large datasets," Technical Report, Dept. of Comp. Sci. & Eng'g, State Univ. of N.Y. at Buffalo, 1999.
J. Zhao et al., "Detecting region outliers in meteorological data," Proceedings of GIS, 2003.
I. Daubechies, "Orthonormal bases of compactly supported wavelets," Communications on Pure & Applied Mathematics, 1988.
M. Marwah et al., "Stream mining of sensor data for anomalous behavior detection in data centers," HP Technical report HPL-2008-40, Apr. 25, 2008.
Charles K. Chui, "Wavelets: A mathematical tool for signal analysis," Society for Indt'l & Applied Mathematics, Philadelphia, PA, copyright 1997.
Howard L. Resnikoff et al., "Wavelet analysis: The scalable structure of information," Springer-Verlag, New York, NY, copyright 1998.

* cited by examiner

COMPRESSION OF NON-DYADIC SENSOR DATA ORGANIZED WITHIN A NON-DYADIC HIERARCHY

BACKGROUND

Sensors organized into hierarchies are used in a variety of real-world environments. For example, a data center may include a number of server computing devices, or servers, arranged in racks within locations spread around the world. The servers may each be equipped with sensors that monitor the air temperature inlet into the server and the air temperature exhausted from the server. The servers are organized within a hierarchy in that the servers may be organized by location, and within each location, by rack. Other examples of hierarchical sensors include sensors that detect stock prices of stocks organized by sectors, company size, and/or geographical location, as well as geo-spatial sensors that detect various earth conditions, such as barometric pressure, air temperature, and so on.

DETAILED DESCRIPTION

As noted in the background section, hierarchical sensors are used in a variety of real-world environments. Such sensors generate sensor data, which is also hierarchical in correspondence to the hierarchy of the sensors themselves. Because of the vast amount of sensor data that may be generated, it is useful to compress the sensor data before processing, where such processing may include the storage of the sensor data, for instance.

Sensor data is typically non-dyadic, in that the sensor data is organized within hierarchies that are non-dyadic. By comparison, dyadic sensor data is sensor data that is organized within a dyadic hierarchy. Sensor data is dyadic where the data has a length (i.e., a number of leaves within a corresponding hierarchical tree within which the data is organized) equal to $2^k$, where k∈N and where N is a set of all non-negative integers. A hierarchy that organizes sensor data over a number of hierarchical subsets is dyadic where each subset has a length equal to $2^h$, where h∈N. Non-dyadic sensor data is therefore sensor data that does not have a length equal to $2^k$, and a hierarchy of sensor data that organizes the data over a number of hierarchical subsets is non-dyadic where at least one subset does not have a length equal to $2^h$.

The inventors have developed a novel approach to compress sensor data that is organized within a non-dyadic hierarchy. In particular, a discrete wavelet transform is generated based on the sensor data and the hierarchy of the sensor data to compress the sensor data. As such, hierarchical sensor data that is not dyadic, and that has a hierarchy that is not dyadic, can nevertheless be compressed. In this respect, the inventive approach is advantageous over existing approaches, such as the Haar wavelet approach, which can only compress dyadic sensor data organized within a dyadic hierarchy.

Figure 1:
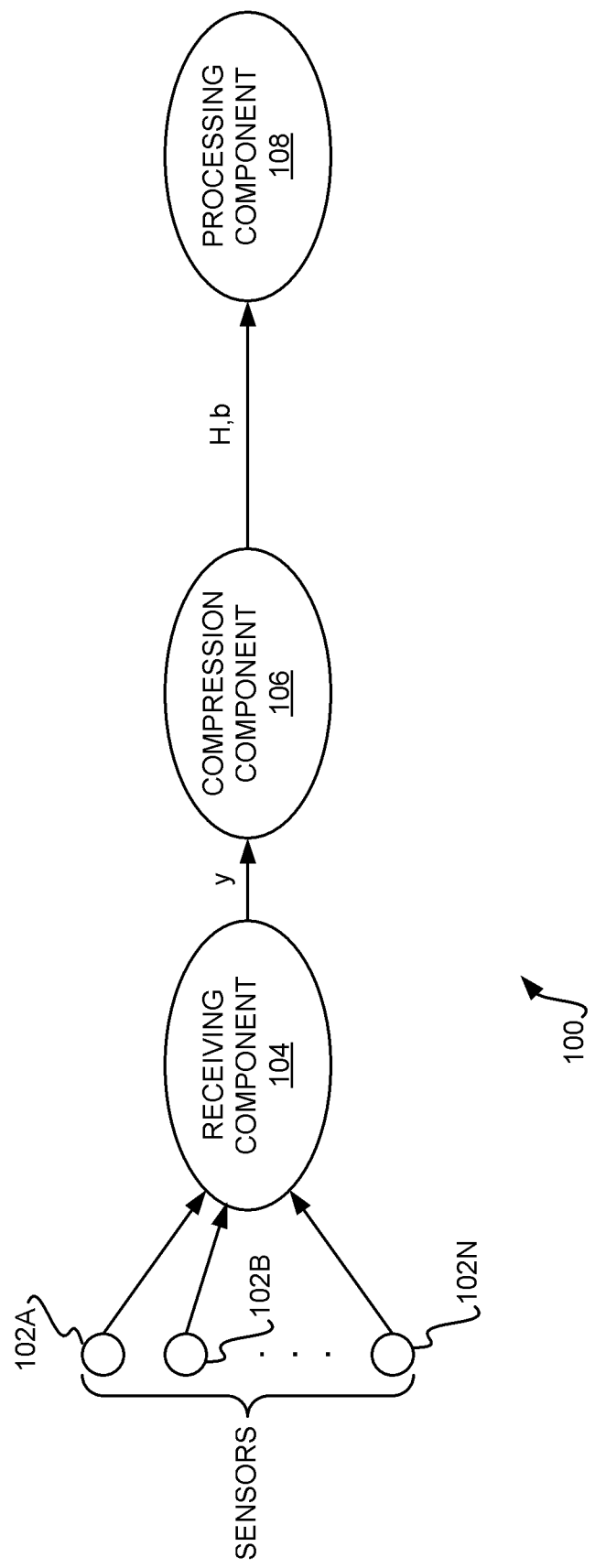
FIG. 1 is a diagram of a system, according to an embodiment of the disclosure.

FIG. 1 shows a system 100, according to an embodiment of the disclosure. The system 100 includes a number of sensors 102A, 102B, ..., 102N, collectively referred to as the sensors 102. The system 100 further includes a receiving component 104, a compression component 106, and a processing component 108. The components 104, 106, and 108 may each be implemented in software, hardware, or a combination of software and hardware. For instance, each component may be implemented as one or more computer programs stored on a computer-readable medium and that are executable by one or more processors of one or more computing devices.

The receiving component 104 receives sensor data collected by the sensors 102. The term sensor is used herein in a broad and non-limiting sense. For example, a sensor may detect real-world data, such as temperature, humidity, and so on. As another example, a sensor may be considered as detecting stock prices, number of instructions processed per processor cycle, and so on. These examples illustrate the wide variety of the types of sensors 102 and the types of sensor data that are amenable to embodiments of the present disclosure.

The receiving component 104 transmits the sensor data to the compression component 106, which thus receives the sensor data from the receiving component 104. The sensor data is denoted as y, as indicated by the arrow 110. The sensor data includes a number of individual data elements $y_k$. The compression component 106 compresses the sensor data by generating a discrete wavelet transform based on the sensor data and based on a hierarchy of the sensor data. The compressed sensor data is denoted as H, b, as indicated by the arrow 112.

It is noted that the sensor data y can be represented as:

$$y = H^*b$$

In this equation, H is a wavelet basis matrix, b is a coefficient matrix, and the operator "*" represents the conjugate transpose of a matrix. Thus, by generating a discrete wavelet transform represented by H and b, the compression component 106 compresses the sensor data received from the receiving component 104.

The compression component 106 transmits the compressed sensor data, specifically the discrete wavelet transform as represented by H and b, to the processing component 108, which thus receives the compressed sensor data from the compression component 106. The processing component 108 then processes the sensor data as has been compressed. As a rudimentary example, the processing component 108 may simply store the compressed sensor data on a non-volatile computer-readable medium, such as a magnetic medium like a hard disk drive.

More specifically, the result of compressing the sensor data is coefficient matrix b, where for sensor data that has a fixed hierarchy, the wavelet basis matrix is determined once. For all new sensor data, the coefficient matrix b is determined, and part of this coefficient matrix is stored as the compressed sensor data itself. For example, if there are 1,000 sensors generating 1,000 sensor data points, a small set of values of the coefficient matrix b may be stored. For instance, if just 10 values of the coefficient matrix b are stored, then 99% compression is achieved.

Figure 2:
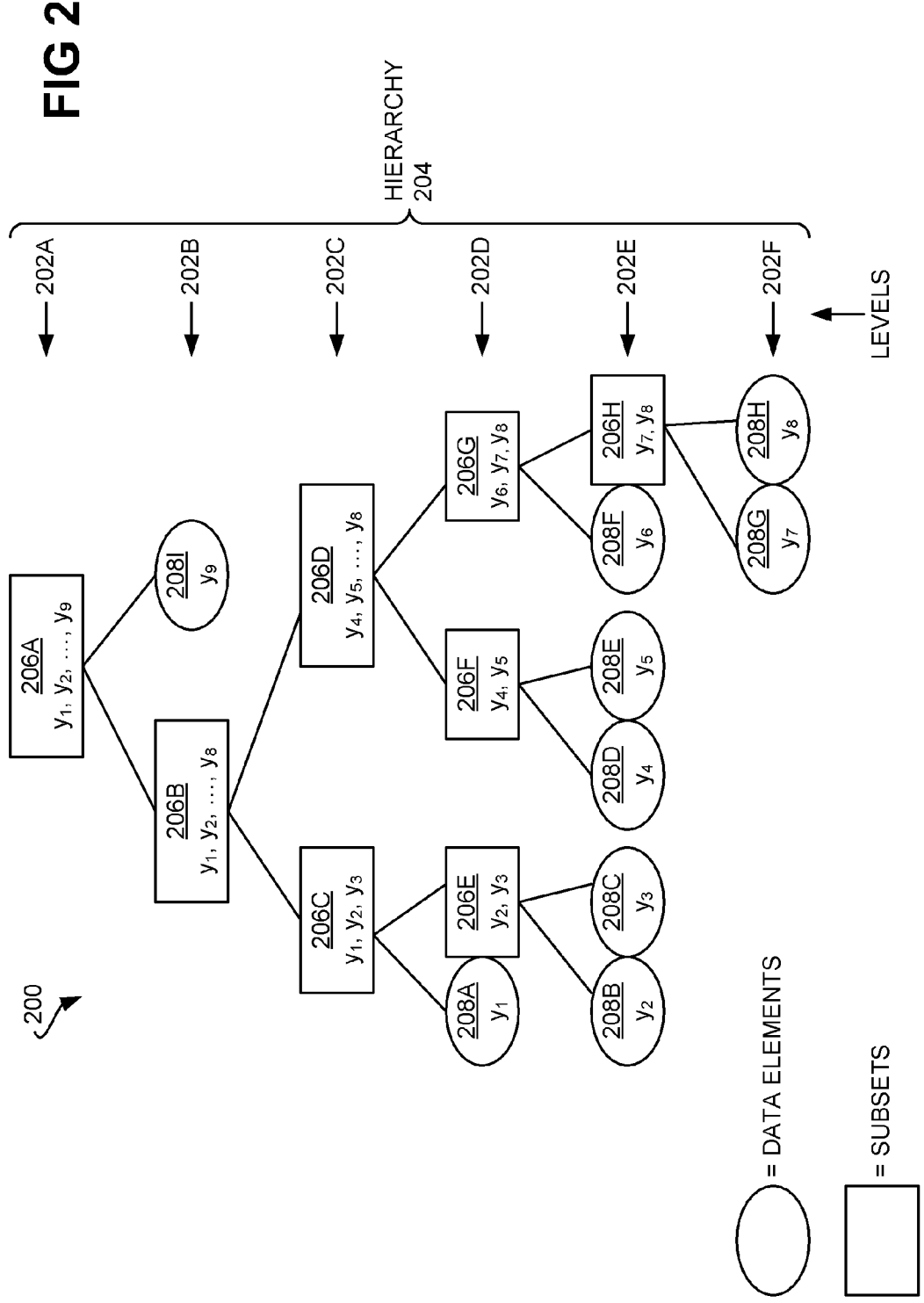
FIG. 2 is a diagram of exemplary non-dyadic sensor data organized within a non-dyadic hierarchy, according to an embodiment of the disclosure.

FIG. 2 shows exemplary non-dyadic sensor data 200 organized within a non-dyadic hierarchy 204, according to an embodiment of the disclosure. The sensor data 200 includes nine individual data elements 208A, 208B, ..., 208I, which are collectively referred to as the data elements 208, and which correspond to the individual data elements $y_1, y_2, \ldots y_9$. The sensor data 200 is non-dyadic, because the data 200 has a length unequal to $2^k$, where k∈N and where N is a set of all non-negative integers. That is, the number of data elements 208 within the sensor data 200 is equal to 9, and there is no non-negative integer k for which $2^k=9$.

The hierarchy 204 within which the sensor data 200 is organized has six hierarchical levels 202A, 202B, 202C, 202D, 202E, and 202F, collectively referred to as the hierarchical levels 202. The top-most, or highest, level 202A includes a subset 206A of all the data elements 208. The second level 202B divides the set 206A into the subset 206B having the data elements $y_1, y_2, \ldots, y_8$ and the individual data element $y_9$. The third level 202C divides the subset 206B into a subset 206C having the data elements $y_1, y_2, y_3$, and a subset 206D having the data elements $y_4, y_5, \ldots, y_8$. The fourth level 202D divides the subset 206C into the individual data element $y_1$ and a subset 206E having the data elements $y_2, y_3$, and divides the subset 206D into a subset 206F having the data elements $y_4, y_5$ and a subset 206G having the data elements $y_6, y_7, y_8$. The fifth level 202E divides the subset 206E into the individual data elements $y_2$ and $y_3$, the subset 206F into the individual data elements $y_4$ and $y_5$, and the subset 206G into the individual data element $y_6$ and a subset 206H having the data elements $y_7, y_8$. Finally, the bottom-most, or lowest, level 202F divides the subset 206H into the individual data elements $y_7$ and $y_8$.

Each given subset is thus divided into two nodes, where each node is a smaller subset than the given subset or a single data element. The hierarchy 204 is constructed in a bottom-up manner, from the individual data elements. The hierarchy 204 is used to construct the wavelet basis matrix H. By comparison, the coefficient matrix b can be constructed from the wavelet basis matrix H or from the hierarchy 204 itself.

The subsets 206A, 206B, . . . , 206H over which the hierarchical levels 202 organize the sensor data 200 are referred to as the subsets 206, and are themselves hierarchical in correspondence with the levels 202 in which they are located. The hierarchy 204 is non-dyadic, because at least one of the hierarchical subsets 206 has a length unequal to $2^h$, where h∈N and where N is a set of all non-negative integers. That is, at least one of the hierarchical subsets has a length f for which there is no non-negative integer k for which $2^k=f$.

The individual data elements 208 are organized within the hierarchical subsets 206 of the hierarchical levels 202 of the hierarchy 204 by what are referred to as a series of intervals. Each interval includes the individual data elements within subset j of level i, where the subsets within each level are numbered starting at j=1 with the subset at the left-hand side in FIG. 2. In this sense, each subset is an interval. The data elements within subset j of level i are referred to as $S_{i,j}$.

The individual data elements 208 are thus organized within a series of intervals, starting from the subset of a bottom-most level that has a subset, which in this example is the level 202E because the level 202F does not have any subsets, and proceeding to the subset of the top-most level 202A. Within each such level, the series of intervals is ordered from the first subset of the level to the last subset of the level, if the level in question has more than one subset. Therefore, for the example in FIG. 2, the individual data elements 208 are organized within the series of intervals: $\{y_7, y_8\}, \{y_2, y_3\}, \{y_4, y_5\}, \{y_6, y_7, y_8\}, \{y_1, y_2, y_3\}, \{y_4, y_5, \ldots, y_8,\}, \{y_1, y_2, \ldots, y_8\}$, and $\{y_1, y_2, \ldots, y_9\}$, which correspond to the subsets 206H, 206E, 206F, 206G, 206C, 206D, 206B, and 206A, respectively.

Furthermore, the number of elements at level i, interval j is denoted as $n_{i,j}=|S_{i,j}|$. For example, for hierarchical level 202A, which is level 0, the elements y within this level are $S_{0,1}$, and the number of the elements y within this level is equal to $n_{0,1}=|S_{0,1}|$. As another example, for hierarchical level 202C, which is level 2, the elements within this level are $S_{2,1} \cup S_{2,2}$, and the number of elements within this level is equal to $n_{2,1}+n_{2,2}=|S_{2,1}|+|S_{2,2}|$. As a final example, the elements within the subset 206D of the level 202C, which is interval 2 of level 2, are equal to the union of the elements within the subsets 206F and 206G of the level 202D, which are intervals 2 and 3 of level 3. That is, $S_{2,2}=S_{3,2} \cup S_{3,3}$, and $n_{2,2}=|S_{2,2}|=n_{3,2}+n_{3,3}|S_{3,2}|+|S_{3,3}|$.

Figure 3:
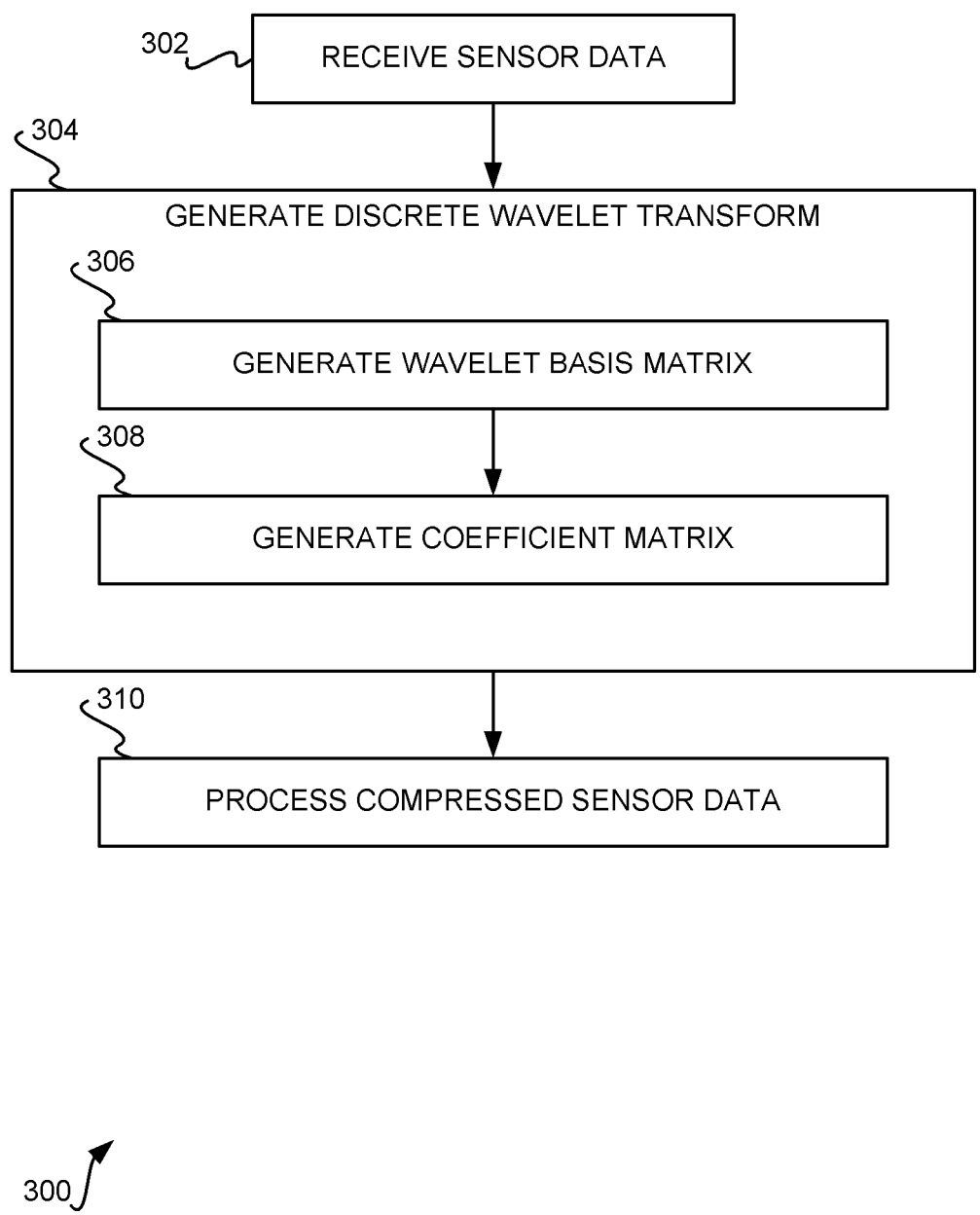
FIG. 3 is a flowchart of a method, according to an embodiment of the disclosure.

FIG. 3 shows a method 300, according to an embodiment of the disclosure. As with other embodiments of the disclosure, the method 300 may be implemented as one or more computer programs stored on a computer-readable medium. Execution of the computer programs by one or more processors of one or more computing devices results in performance of the method 300. The computer-readable medium may be a volatile medium, such as volatile semiconductor memory, or a non-volatile medium, such as a non-volatile magnetic medium like a hard disk drive, or such as a non-volatile semiconductor memory like flash memory. As such, each part of the method 300 may be considered as being performed by a processor of a computing device in one embodiment.

Sensor data is received from one or more sensors (302). The sensor data is organized within a hierarchy. Both the sensor data and the hierarchy are non-dyadic. The sensor data y may be received by the receiving component 104 of FIG. 1 from the sensors 102 of FIG. 1. The receiving component 104 in this case then sends the sensor data y to the compression component 106 of FIG. 1.

A discrete wavelet transform is generated, based on the sensor data and based on the hierarchy of the sensor data, to compress the sensor data (304). The discrete wavelet transform is represented by the wavelet basis matrix H and the coefficient matrix b, as described above, such that the discrete wavelet transform is equal to H'b. The compression component 106 of FIG. 1 may generate the discrete wavelet transform, which represents a compression of the sensor data y. The compression component 106 sends the wavelet basis matrix H and the coefficient matrix b to the processing component 108 of FIG. 1. In particular, just some of the values of the coefficient matrix b may be selected as representing the compression of the sensor data y.

Generation of the discrete wavelet transform in part 304 includes the following. The wavelet basis matrix H is generated (306), and the coefficient matrix b is also generated (308). The order in which the wavelet basis matrix and the coefficient matrix are generated is not important, and the two matrices can indeed be generated simultaneously if desired. As noted above, for a fixed hierarchy the wavelet basis matrix H is generated just once. The manner by which the wavelet basis matrix H can be generated, and the manner by which the coefficient matrix b can be generated, are described later in the detailed description.

The sensor data, as has been compressed via generation of the discrete wavelet transform, is then processed (310). For example, the compressed sensor data—i.e., the wavelet basis matrix H and the coefficient matrix b—can be stored on a non-volatile computer-readable medium for later retrieval. The compressed sensor data can also be processed in other ways besides storage. For example, the compressed sensor data can be examined to discern trends in the sensor data, to determine whether any critical conditions have occurred as represented by the sensor data, and so on. The processing component 108 of FIG. 1 can perform part 310.

Figure 4:
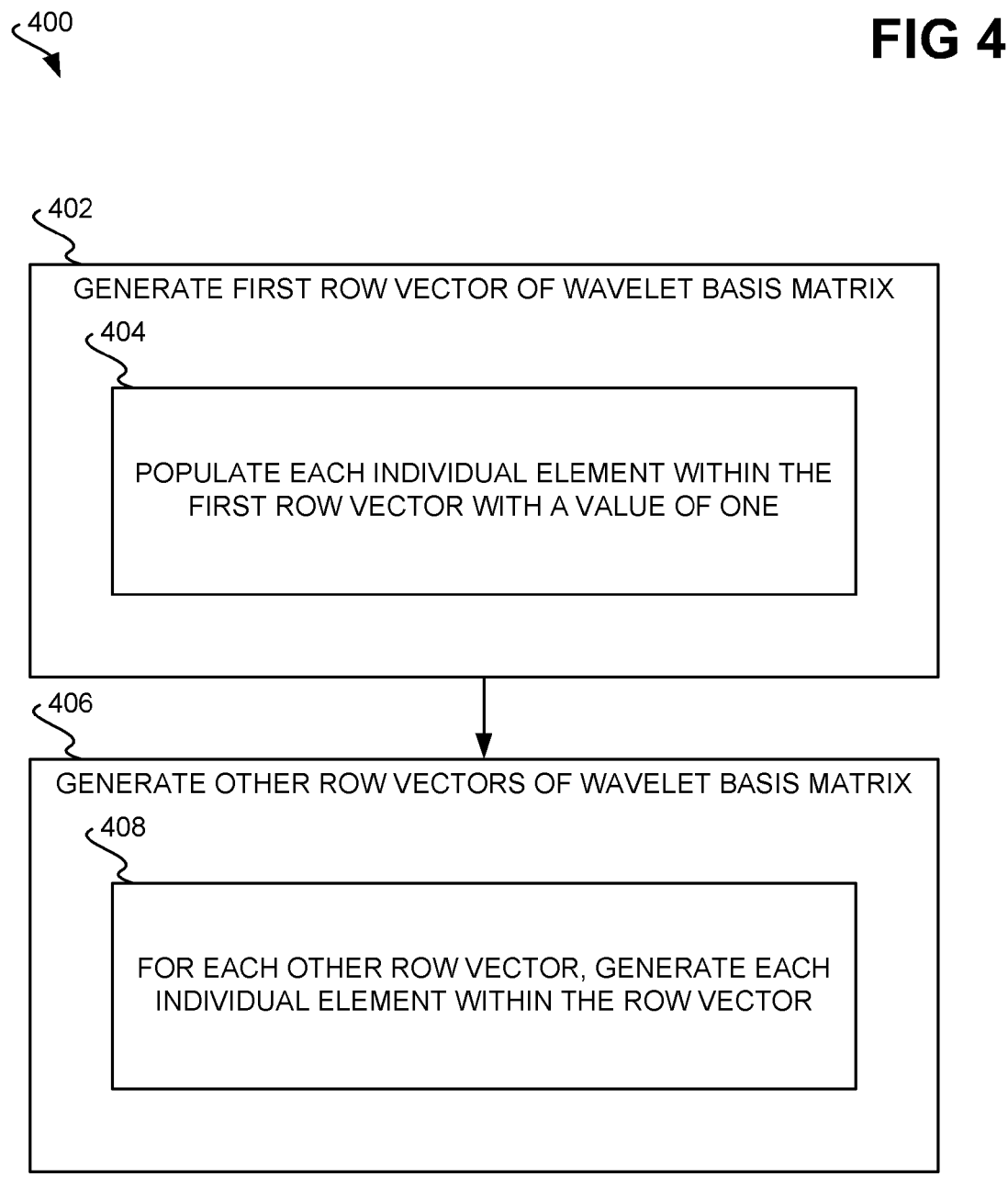
FIG. 4 is a flowchart of a method for generating a wavelet basis matrix, according to an embodiment of the disclosure.

FIG. 4 shows a method 400 for generating the wavelet basis matrix H in part 306 of the method 300 of FIG. 3, according to an embodiment of the disclosure. The wavelet basis matrix H is a square matrix having the size z×z. As such, the wavelet basis matrix has a number of row vectors $H_l$, where $0 \le l < z$. Furthermore, each row vector $H_l$ has a number of individual elements $H_{l,m}$, where $0 \le m < n$.

The first row vector $H_0$ of the wavelet basis matrix H is generated (402). This is achieved by populating each individual element $H_{0,m}$ within the first row vector $H_0$ with a value of one (404). As such, the first row vector $H_0$ is equal to $\{1, 1, \ldots, 1\}$. The first row vector $H_0$ is said to correspond to the approximation coefficient(s) of the coefficient matrix b, the generation of which is described later in the detailed description.

All the other row vectors $H_l$, $0<l<z$, of the wavelet basis matrix H are then generated (406). This is achieved by generating each individual element $H_{l,m}$ within each such row vector $H_l$ (408), as follows:

$$H_{l,m} = \begin{cases} \left(\sqrt{n}\frac{1}{2}\sqrt{\frac{n_a+n_b}{n_a n_b}}\right)\frac{2n_b}{n_a+n_b} & \text{if } y_m \in S_{i+1,j} \\ -\left(\sqrt{n}\frac{1}{2}\sqrt{\frac{n_a+n_b}{n_a n_b}}\right)\frac{2n_b}{n_a+n_b} & \text{if } y_m \in S_{i+1,j+1} \\ 0 & \text{otherwise} \end{cases}$$

As noted above, y is the set of the sensor data, $y_m$ is an individual element of the set of the sensor data, and there are n total individual elements $y_m$ within the set of sensor data. Each level i of the hierarchy has an interval j of individual elements of the sensor data, and the individual elements at level i and interval j are denoted by $S_{i,j}$. The row vectors $H_l$, $0<l<z$, are said to correspond to the detail coefficients of the coefficient matrix b, the generation of which is described later in the detailed description. Furthermore, $n_a$ is a number of points in a left child node of the individual element $H_{l,m}$, and $n_b$ is a number of points in a right child node of the individual element $H_{l,m}$.

Figure 5:
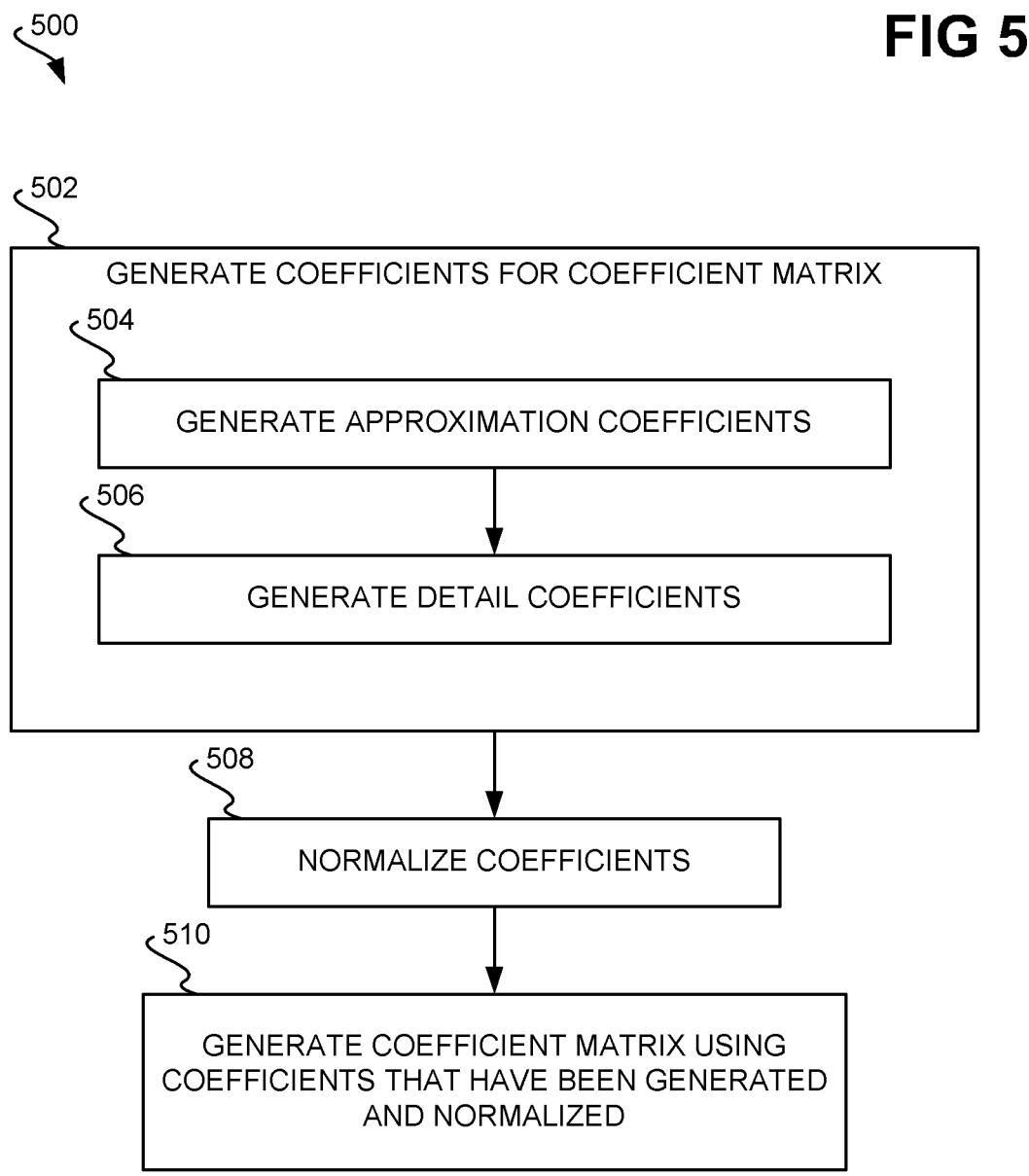
FIG. 5 is a flowchart of a method for generating a coefficient matrix, according to an embodiment of the disclosure.

FIG. 5 shows a method 500 for generating the coefficient matrix b in part 308 of the method 300 of FIG. 3, according to an embodiment of the disclosure. The coefficient matrix b includes one or more approximation coefficients and more than one detail coefficient. For a given interval $S_{i,j}$, the approximation coefficient is referred to as $a_{i,j}$, and the detail coefficient is referred to as $c_{i,j}$.

In general, the approximation coefficients provide a general approximation of the sensor data upon the sensor data being compressed. The approximation coefficients corresponding to the lowest level of the hierarchy within which the sensor data has been organized represent averages of successive values of the sensor data. The approximation coefficients corresponding to the other, higher levels of the hierarchy represent averages of successive approximation coefficients of lower levels of the hierarchy.

Furthermore, in general, the detail coefficients provide a level of detail of the sensor data upon the sensor data being compressed. The detail coefficients corresponding to the lowest level of the hierarchy represent differences between successive values of the sensor data. The detail coefficients corresponding to the other, higher levels of the hierarchy represent differences of the approximation coefficients of lower levels of the hierarchy.

The method 500 generates the coefficients for the coefficient matrix b (502), by generating the approximation coefficients (504), and by generating the detail coefficients (506). Each approximation coefficient is generated in part 504 as follows:

$$a_{i,j} = \frac{\sum_{k \in S_{i,j}} y_k}{|S_{i,j}|}$$

Furthermore, each detail coefficient is more specifically generated in part 506 as follows:

$$c_{i,j} = \frac{a_{i+1,k} - a_{i+1,k+1}}{2} = \frac{\frac{\sum_{m \in S_{i+1,k}} y_m}{|S_{i+1,k}|} - \frac{\sum_{m \in S_{i+1,k+1}} y_m}{|S_{i+1,k+1}|}}{2}$$

As noted above, $a_{i,j}$ is an approximation coefficient, and $c_{i,j}$ is a detail coefficients. Furthermore, y is the set of the sensor data, $y_k$ is an individual element of the set of the sensor data, and there is a total of n individual elements $y_k$ within the set of the sensor data. Each level i of the hierarchy has an interval j of individual elements of the sensor data, and the individual elements at level i and interval j are denoted by $S_{i,j}$.

The method 500 then normalizes the approximation coefficients and the detail coefficients that have been generated (508). Normalization is achieved so that the wavelet matrix H is such that $HH'=nI$, where I is the identity matrix, and as before, n is the number of individual data elements $y_k$ within the sensor data y. Each approximation coefficient can be normalized as follows:

$$a_{i,j} = \left(\frac{1}{\sqrt{n}}\right)\left(\sqrt{|S_{i,j}|}\right) a_{i,j}$$

Furthermore, each detail coefficient can be normalized as follows:

$$c_{i,j} = \left(\frac{1}{\sqrt{n}}\right)\left(\frac{1}{2}\sqrt{\frac{|S_{i+1,k}||S_{i+1,k+1}|}{|S_{i+1,k}|+|S_{i+1,k+1}|}}\right) c_{i,j}$$

The method 500 finally generates the coefficient matrix b by using the approximation coefficients and the detail coefficients that have been generated and normalized (510). For the sensor data y, the coefficient matrix b has n coefficients, equal to the number of individual data elements $y_k$ within the sensor data y. The first coefficient within the coefficient matrix b is selected as the approximation coefficient $a_{0,1}$. The remaining n−1 coefficients of the coefficient matrix b are selected as the detail coefficients, starting from the detail coefficient of the first level of the hierarchy, and continuing towards the last detail coefficient of the last level of the hierarchy, until n−1 detail coefficients have been chosen. As such, the coefficient matrix b can be expressed as:

$$b = \{a_{0,1}, c_{0,1}, c_{1,1}, c_{1,2}, \ldots\}'$$

Figure 6:
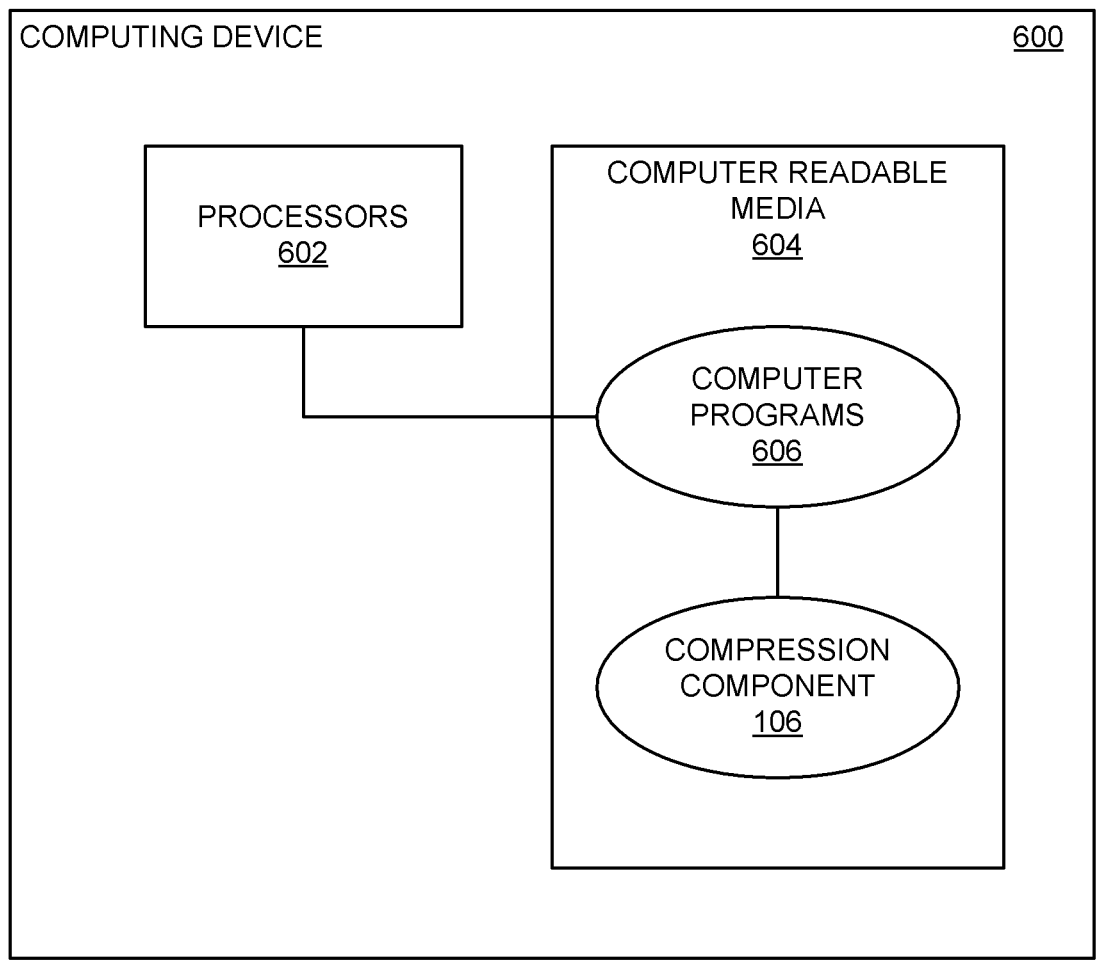
FIG. 6 is a diagram of a representative computing device, according to an embodiment of the disclosure.

In conclusion, FIG. 6 shows a rudimentary and representative computing device 600, according to an embodiment of the disclosure. The computing device 600 includes one or more processors 602 and one or more computer-readable media 604. The computing device 600 may include other hardware, in addition to the processors 602 and the computer-readable media 604. The computer-readable media 604 stores one or more computer programs 606 that are executable by the processors 602. The computer-readable medium 604 may be volatile and/or non-volatile media, such as volatile and/or non-volatile semiconductor memory, non-volatile magnetic media, and so on.

The compression component 106 is specifically depicted in FIG. 6 as being implemented by the computer programs 606 as executed by the processors 602. The other components of the system 100 of FIG. 1, such as the receiving component 104 and/or the processing component 108, may be implemented in the same way as the compression component 106. In particular, the components 104 and 108 may be implemented on the same computing device 600 as the compression component 106, or on one or more different computing devices. In the latter case, the various computing devices, including the computing device 600, communicate with one another, such as over a network.

We claim:

1. A method comprising:
    receiving sensor data from one or more sensors, the sensor data organized within a hierarchy, the sensor data and the hierarchy each being non-dyadic;
    generating, by a processor of a computing device, a discrete wavelet transform, based on the sensor data and based on the hierarchy of the sensor data, to compress the sensor data; and,
    processing the sensor data, as has been compressed via generation of the discrete wavelet transform,
    wherein the sensor data comprises a plurality of data points that are unmodified prior to compression and processing,
    and wherein the hierarchy comprises a plurality of nodes including set nodes and non-set nodes, each non-set node including one of the data points, each set node including a different set of the data points, the different set of each set node individually including the data points of each node hierarchically below the set node in the hierarchy such that each data point is individually included in at least two of the nodes including one of the non-set nodes.

2. The method of claim 1, wherein the sensor data and the hierarchy are each non-dyadic in that:
    the sensor data has a length unequal to $2^k$, where k∈N and where N is a set of all non-negative integers; and,
    the sensor data is divided into a plurality of hierarchical subsets, where at least one of the hierarchical subsets has a length unequal to $2^h$, where h∈N.

3. The method of claim 1, wherein generating the discrete wavelet transform based on the sensor data and based on the hierarchy of the sensor data comprises generating a wavelet basis matrix having a plurality of row vectors.

4. The method of claim 3, wherein generating the wavelet basis matrix comprises:
    generating a first row vector $H_0$ as equal to $\{1, 1, \ldots, 1\}$; and,
    generating each row vector $H_l$, where l is equal to 1 to n−1, and n is equal to a number of row vectors within the wavelet basis matrix, by generating each individual element $H_{l,m}$ of the row vector $H_1$, where 1≤m <n, and n is equal to a number of elements within each row vector $H_l$.

5. The method of claim 4, wherein generating each individual element $H_{l,m}$ comprises evaluating:

$$H_{l,m} = \begin{cases} \left(\sqrt{n}\,\frac{1}{2}\sqrt{\frac{n_a+n_b}{n_a n_b}}\right)\frac{2n_b}{n_a+n_b} & \text{if } y_m \in S_{i+1,j} \\ -\left(\sqrt{n}\,\frac{1}{2}\sqrt{\frac{n_a+n_b}{n_a n_b}}\right)\frac{2n_b}{n_a+n_b} & \text{if } y_m \in S_{i+1,j+1} \\ 0 & \text{otherwise,} \end{cases}$$

wherein y is a set of the sensor data and $y_m$ is an individual element of the set of the sensor data, there is a total of n individual elements $y_m$ within the set of the sensor data y, where each level i of the hierarchy has an interval j of individual elements of the sensor data, the individual elements at level i and interval j are denoted by $S_{i,j}$, $n_a$ is a number of points in a left child node of the individual element $H_{l,m}$, and $n_b$ is a number of points in a right child node of the individual element $H_{l,m}$.

6. The method of claim 1, wherein generating the discrete wavelet transform based on the sensor data and based on the hierarchy of the sensor data comprises generating a coefficient matrix.

7. The method of claim 6, wherein generating the coefficient matrix comprises:
    generating a plurality of coefficients including one or more approximation coefficients and a plurality of detail coefficients,
    where the approximation coefficients provide a general approximation of the sensor data in compressing the sensor data, in that a lowest level of the approximation coefficients represent averages of successive values of the sensor data, and other levels of the approximation coefficients represent averages of successive approximation coefficients of lower levels of the approximation coefficients,
    and where the detail coefficients provide a level of detail of the sensor data in compressing the sensor data, in that a lowest level of the detail coefficients represents differences between successive values of the sensor data, and other levels of the detail coefficients represent differences of the approximation coefficients of the lower levels of the approximation coefficients;
    normalizing the approximation coefficients and the detail coefficients; and,
    using the approximation coefficients and the detail coefficients that have been generated and normalized to generate the coefficient matrix.

8. The method of claim 6, wherein generating the coefficient matrix comprises:
    generating each approximation coefficient of one or more approximation coefficients by evaluating:

$$a_{i,j} = \frac{\sum_{k \in S_{i,j}} y_k}{|S_{i,j}|};$$

generating each detail coefficient of a plurality of detail coefficients by evaluating:

$$c_{i,j} = \frac{a_{i+1,k} - a_{i+1,k+1}}{2} = \frac{\dfrac{\sum_{m \in S_{i+1,k}} y_m}{|S_{i+1,k}|} - \dfrac{\sum_{m \in S_{i+1,k+1}} y_m}{|S_{i+1,k+1}|}}{2},$$

normalizing the approximation coefficients and the detail coefficients,
where normalizing each approximation coefficient comprises evaluating:

$$a_{i,j} = \left(\frac{1}{\sqrt{n}}\right)\left(\sqrt{|S_{i,j}|}\right)a_{i,j},$$

and where normalizing each detail coefficient comprises evaluating:

$$c_{i,j} = \left(\frac{1}{\sqrt{n}}\right)\left(\frac{1}{2}\sqrt{\frac{|S_{i+1,k}||S_{i+1,k+1}|}{|S_{i+1,k}|+|S_{i+1,k+1}|}}\right)c_{i,j};$$

and,
selecting one of the approximation coefficients and selecting n−1 of the detail coefficients to generate the coefficient matrix,
wherein $a_{i,j}$ is one of the approximation coefficients, $c_{i,j}$ is one of the detail coefficients, y is a set of the sensor data and $y_k$ is an individual element of the set of the sensor data, n is a number of the individual elements $y_k$ within the set of the sensor data, each level i of the hierarchy has an interval j of individual elements of the sensor data, and the individual elements at level i and interval j are denoted by $S_{i,j}$.

9. A non-transitory computer-readable storage medium having a computer program stored thereon, wherein execution of the computer program by a processor results in performance of a method comprising:
receiving sensor data from one or more sensors, the sensor data organized within a hierarchy, the sensor data and the hierarchy each being non-dyadic; and,
generating, by a processor of a computing device, a discrete wavelet transform, based on the sensor data and based on the hierarchy of the sensor data, to compress the sensor data,
wherein the sensor data comprises a plurality of data points that are unmodified prior to compression and processing,
and wherein the hierarchy comprises a plurality of nodes, each node including first nodes individually including just one data point and second nodes individually including multiple data points, each data point individually in just one of the first node and individually in at least one of the second nodes.

10. The non-transitory computer-readable storage medium of claim 9, wherein the sensor data and the hierarchy are each non-dyadic in that:
the sensor data has a length unequal to $2^k$, where k∈N and where N is a set of all non-negative integers; and,
the sensor data is divided into a plurality of hierarchical subsets, where at least one of the hierarchical subsets has a length unequal to $2^h$, where h∈N.

11. The non-transitory computer-readable storage medium of claim 9, wherein generating the discrete wavelet transform based on the sensor data and based on the hierarchy of the sensor data comprises generating a wavelet basis matrix having a plurality of row vectors by:
generating a first row vector $H_0$ as equal to $\{1, 1, \ldots, 1\}$; and,
generating each row vector $H_l$, where l is equal to 1 to n−1, and n is equal to a number of row vectors within the wavelet basis matrix, by generating each individual element $H_{l,m}$ of the row vector $H_l$, where $1 \leq m < n$, and n is equal to a number of elements within each row vector $H_l$, by evaluating $$H_{l,m} = \begin{cases} \left(\sqrt{n}\frac{1}{2}\sqrt{\frac{n_a+n_b}{n_a n_b}}\right)\frac{2n_b}{n_a+n_b} & \text{if } y_m \in S_{i+1,j} \\ -\left(\sqrt{n}\frac{1}{2}\sqrt{\frac{n_a+n_b}{n_a n_b}}\right)\frac{2n_b}{n_a+n_b} & \text{if } y_m \in S_{i+1,j+1} \\ 0 & \text{otherwise,} \end{cases}$$

wherein y is a set of the sensor data and $y_m$ is an individual element of the set of the sensor data, there is a total of n individual elements $y_m$ within the set of the sensor data y, where each level i of the hierarchy has an interval j of individual elements of the sensor data, the individual elements at level i and interval j are denoted by $S_{i,j}$, $n_a$ is a number of points in a left child node of the individual element $H_{l,m}$ and $n_b$ is a number of points in a right child node of the individual element $H_l$.

12. The non-transitory computer-readable storage medium of claim 9, wherein generating the discrete wavelet transform based on the sensor data and based on the hierarchy of the sensor data comprises:
generating one or more approximation coefficients and a plurality of detail coefficients for a coefficient matrix,
where generating each approximation coefficient comprises evaluating:

$$a_{i,j} = \frac{\sum_{k \in S_{i,j}} y_k}{|S_{i,j}|},$$

where generating each detail coefficient comprises evaluating:

$$c_{i,j} = \frac{a_{i+1,k} - a_{i+1,k+1}}{2} = \frac{\frac{\sum_{m \in S_{i+1,k}} y_m}{|S_{i+1,k}|} - \frac{\sum_{m \in S_{i+1,k+1}} y_m}{|S_{i+1,k+1}|}}{2},$$

normalizing the approximation coefficients and the detail coefficients,
where normalizing each approximation coefficient comprises evaluating:

$$a_{i,j} = \left(\frac{1}{\sqrt{n}}\right)\left(\sqrt{|S_{i,j}|}\right)a_{i,j},$$

and where normalizing each detail coefficient comprises evaluating:

$$c_{i,j} = \left(\frac{1}{\sqrt{n}}\right)\left(\frac{1}{2}\sqrt{\frac{|S_{i+1,k}||S_{i+1,k+1}|}{|S_{i+1,k}|+|S_{i+1,k+1}|}}\right)c_{i,j};$$

and,
generating the coefficient matrix by selecting one of the approximation coefficients and by selecting n−1 of the detail coefficients, wherein $a_{i,j}$ is one of the approximation coefficients, $c_{i,j}$ is one of the detail coefficients, y is a set of the sensor data and $y_k$, n is a number of the individual elements $y_k$ within the set of the sensor data, each level i of the hierarchy has an interval j of individual elements of the sensor data, and the individual elements at level i and interval j are denoted by $S_{i,j}$.

13. A system comprising:

one or more processors;

one or more non-transitory computer-readable storage media to store one or more computer programs executable by the processors; and, a compression component implemented by the computer programs to compress non-dyadic sensor data received from one or more sensors and organized within a non-dyadic hierarchy, by generating a discrete wavelet transform based on the sensor data and based on the hierarchy of the sensor data, wherein the sensor data comprises a plurality of data points that are unmodified prior to compression and processing, and wherein the hierarchy comprises a plurality of nodes including set nodes and non-set nodes, each set node having one or more child nodes, each child node being one of the set nodes or one of the non-set nodes, each non-set node individually including just one of the data points and not having any child nodes, each set node individually including the data points of each node hierarchically below the set node in the hierarchy such that each data point is individually included in just one of the non-set nodes and individually in at least one of the set nodes.

14. The system of claim 13, wherein the compression component is to generate the discrete wavelet transform by generating a wavelet basis matrix having a plurality of row vectors, wherein a first row vector $H_0$ is equal to $\{1, 1, \ldots, 1\}$, wherein each row vector $H_l$, where l is equal to 1 to n−1, and n is equal to a number of row vectors within the wavelet basis matrix, and each individual element $H_{l,m}$ of the row vector $H_l$, where $1 \leq m < n$, and n is equal to a number of elements within each row vector $H_l$, is expressed as:

$$H_{l,m} = \begin{cases} \left(\sqrt{n}\,\frac{1}{2}\sqrt{\frac{n_a + n_b}{n_a n_b}}\right)\frac{2n_b}{n_a + n_b} & \text{if } y_m \in S_{i+1,j} \\ -\left(\sqrt{n}\,\frac{1}{2}\sqrt{\frac{n_a + n_b}{n_a n_b}}\right)\frac{2n_b}{n_a + n_b} & \text{if } y_m \in S_{i+1,j+1} \\ 0 & \text{otherwise,} \end{cases}$$

and wherein y is a set of the sensor data and $y_m$ is an individual element of the set of the sensor data, there is a total of n individual elements $y_m$ within the set of the sensor data, where each level i of the hierarchy has an interval j of individual elements of the sensor data, and the individual elements at level i and interval j are denoted by $S_{i,j}$, $n_a$ is a number of points in a left child node of the individual element $H_{l,m}$ and $n_b$ is a number of points in a right child node of the individual element $H_l$.

15. The system of claim 13, wherein the compression component is to generate the discrete wavelet transform by generating one or more approximation coefficients and a plurality of detail coefficients of a coefficient matrix, wherein each approximation coefficient is expressed as:

$$a_{i,j} = \frac{\sum_{k \in S_{i,j}} y_k}{|S_{i,j}|},$$

wherein each detail coefficient is expressed as:

$$c_{i,j} = \frac{a_{i+1,k} - a_{i+1,k+1}}{2} = \frac{\frac{\sum_{m \in S_{i+1,k}} y_m}{|S_{i+1,k}|} - \frac{\sum_{m \in S_{i+1,k+1}} y_m}{|S_{i+1,k+1}|}}{2},$$

and wherein $a_{i,j}$ is one of the approximation coefficients, $c_{i,j}$ is one of the detail coefficients, y is a set of the sensor data and $y_k$ is an individual element of the set of the sensor data, n is a number of the individual elements $y_k$ within the set of the sensor data, each level i of the hierarchy has an interval j of individual elements of the sensor data, and the individual elements at level i and interval j are denoted by $S_{i,j}$.

\* \* \* \* \*

UNITED STATES PATENT AND TRADEMARK OFFICE
CERTIFICATE OF CORRECTION

PATENT NO. : 8,898,209 B2
APPLICATION NO. : 12/501446
DATED : November 25, 2014
INVENTOR(S) : Chetan Kumar Gupta et al.

Page 1 of 1

It is certified that error appears in the above-identified patent and that said Letters Patent is hereby corrected as shown below:

In the Claims

In column 7, line 66, in Claim 4, delete "$H_1$," and insert -- $H_l$, --, therefor.

In column 9, line 66, in Claim 11, delete "$H_1$," and insert -- $H_l$, --, therefor.

In column 10, line 2, in Claim 11, delete "$H_1$," and insert -- $H_l$, --, therefor.

In column 10, line 4, in Claim 11, delete "$H_1$," and insert -- $H_l$, --, therefor.

In column 10, line 21, in Claim 11, delete "$H_{1,m}$" and insert -- $H_{l,m}$, --, therefor.

In column 11, line 41, in Claim 14, delete "$H_1$," and insert -- $H_l$, --, therefor.

In column 12, line 16, in Claim 14, delete "$H_{1,m}$" and insert -- $H_{l,m}$, --, therefor.

Signed and Sealed this
Twenty-eighth Day of April, 2015

Michelle K. Lee
*Director of the United States Patent and Trademark Office*